T. S. CAUSEY.
AIR PUMP.
APPLICATION FILED DEC. 6, 1913.
1,147,002.
Patented July 20, 1915.
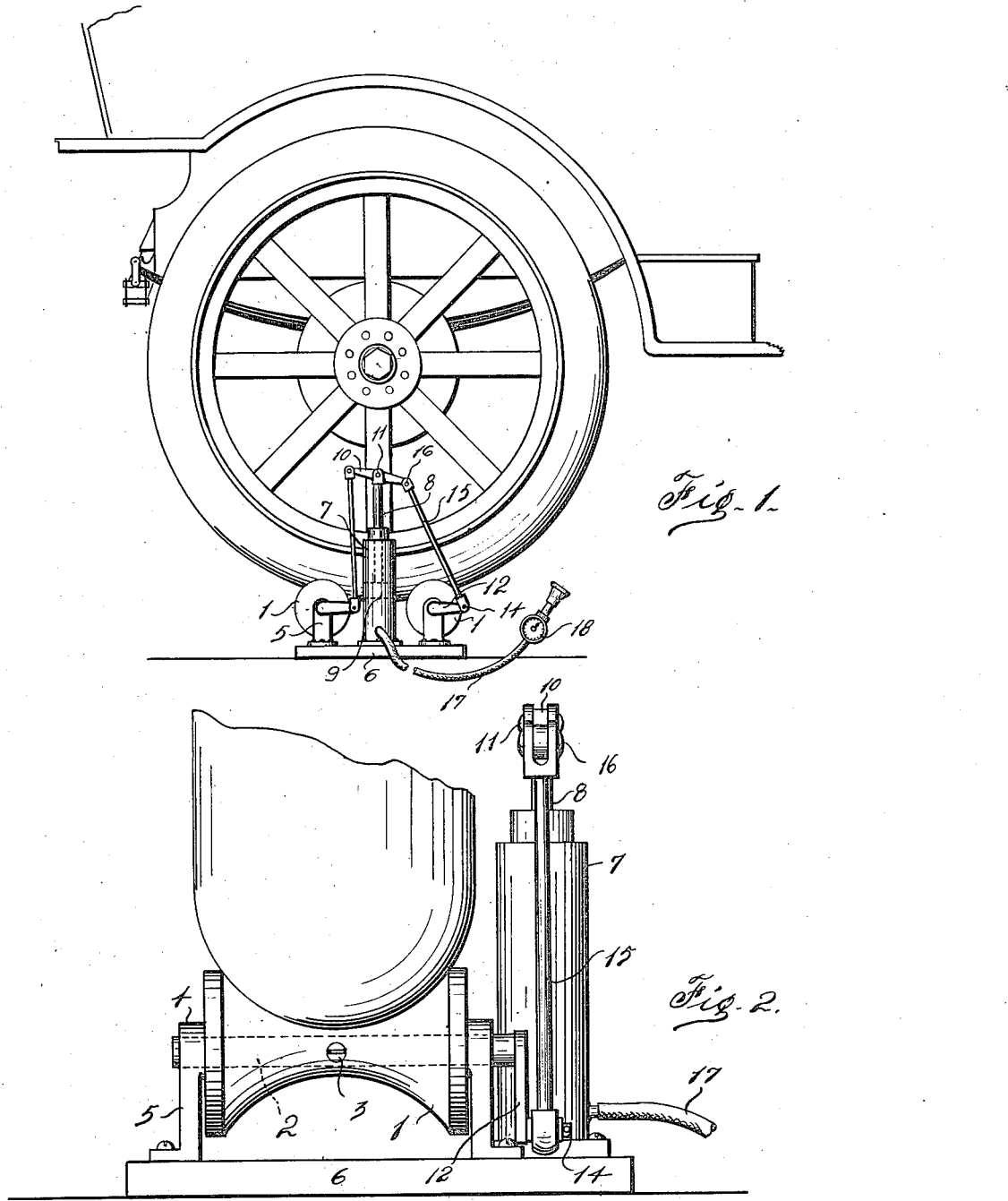
WITNESSES:
INVENTOR
T. S. Causey
BY
ATTORNEY

UNITED STATES PATENT OFFICE.

THOMAS S. CAUSEY, OF DALLAS, TEXAS, ASSIGNOR TO ROBERT B. KELLEY, OF DALLAS, TEXAS.

AIR-PUMP.

1,147,002.  Specification of Letters Patent.  Patented July 20, 1915.

Application filed December 6, 1913. Serial No. 805,149.

*To all whom it may concern:*

Be it known that I, THOMAS S. CAUSEY, citizen of the United States, residing at Dallas, Texas, have invented certain new and useful Improvements in Air-Pumps, of which the following is a specification.

My invention relates to new and useful air pumps.

Primarily the object of the invention is to provide an automobile tire pump that can be power driven from the motor of an automobile.

More specifically the object is to provide a power pump of such mechanism that will be adapted to frictionally engage and be driven by the rear wheel of an automobile.

Finally the object of the invention is to provide a device of the character described that will be strong, durable and efficient, simple and comparatively inexpensive to construct, also one in which the several parts will not be liable to get out of working order.

With the above and other objects in view, the invention has relation to certain novel features of construction and operation, an example of which is described in the specification and illustrated in the accompanying drawing, wherein:

Figure 1 is a side elevation showing the tire pump in position to be driven by the automobile wheel. Fig. 2 is an end elevation of the pump.

Similar reference characters refer to similar parts throughout the several views.

In the drawing the numeral 1 designates a pair of spool-shaped driver members of such a size and shape as to receive and accommodate any standard automobile tire. Said driver members are adapted to frictionally engage the tire and transmit therefrom power sufficient to furnish a quick and convenient air pressure for the automobile tires.

The spool members 1 are fixed upon the shafts 2 with countersunk screws 3, the shaft 2 being journaled in the bearings 4 which are integrally formed with the support brackets 5. The support brackets 5 are rigidly mounted upon a base plate 6. A pump cylinder 7 is rigidly mounted upon the center portion of the base 6. A piston rod 8, which carries the usual piston 9 adapted to reciprocate in the cylinder, carries a cross arm 10 at its upper extremity. The upper extremity of the piston rod 9 is bifurcated and pivotally receives the cross arm 10 as shown at 11. The outer extremities of the shafts 2 carry rigidly fixed crank arms 12. The said crank arms carry at their extremities the crank pins 14. A pair of connecting rods 15 of equal length, have their lower extremities journaled upon the crank pins 14 and their upper extremities pivotally attached to the outer ends of the cross arm 10 as designated by the numeral 16.

The usual rubber tube used in connecting the pump and tire is designated by the numeral 17. A pressure gage 18 of standard type will preferably be used in connection with this pump and located near the end of the tube which will conveniently register the rising pressure in the tire.

In applying the pump to the rear wheel of an automobile, most of the weight of the car will preferably be supported by a jack, which will allow a weight, sufficient to cause good frictional engagement between the spools and the tire, to be impressed upon the spools. When the pump is adjusted as shown in Fig. 1, the engine of the automobile is then slowly run, which drives the pump mechanism just described.

The invention is presented as including all such modifications as properly come within the scope of the following claim.

What I claim is:

In a pump, the combination of a pair of support members, shafts journaled in the support members, spools fixed to the shafts, crank arms carried by the shafts, a pump cylinder, a piston rod, a cross head pivoted on the piston rod and connecting rods correlated with the cross-head and crank arms whereby the said piston rod may be reciprocated by aforesaid shafts rotating in the same direction.

In testimony whereof, I affix my signature in the presence of two witnesses.

THOMAS S. CAUSEY.

Witnesses:
  A. C. CARR,
  J. C. LEDBETTER.